Aug. 26, 1947.  C. W. MEYERS  2,426,406
HYDRAULIC VALVE TESTER
Filed Oct. 10, 1944  3 Sheets-Sheet 1
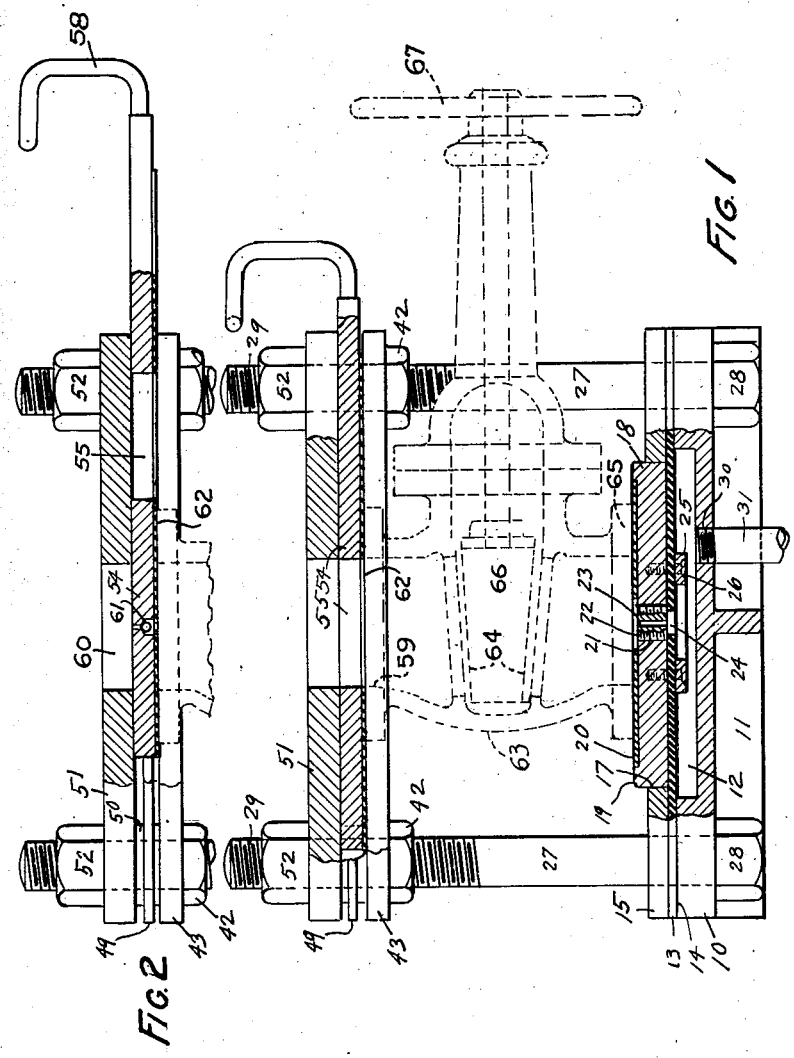
INVENTOR
CORNELIUS W. MEYERS.
BY
ATTORNEY.

Aug. 26, 1947.   C. W. MEYERS   2,426,406
HYDRAULIC VALVE TESTER
Filed Oct. 10, 1944   3 Sheets-Sheet 2
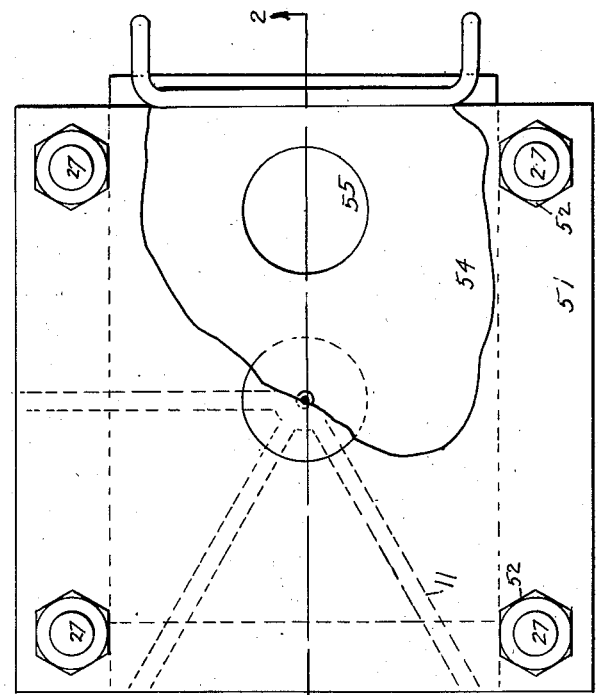
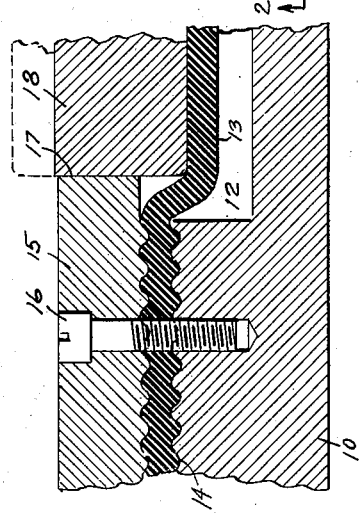
INVENTOR
CORNELIUS W. MEYERS
By E. B. Birkenbeuel
ATTORNEY.

Aug. 26, 1947.    C. W. MEYERS    2,426,406
HYDRAULIC VALVE TESTER
Filed Oct. 10, 1944    3 Sheets-Sheet 3
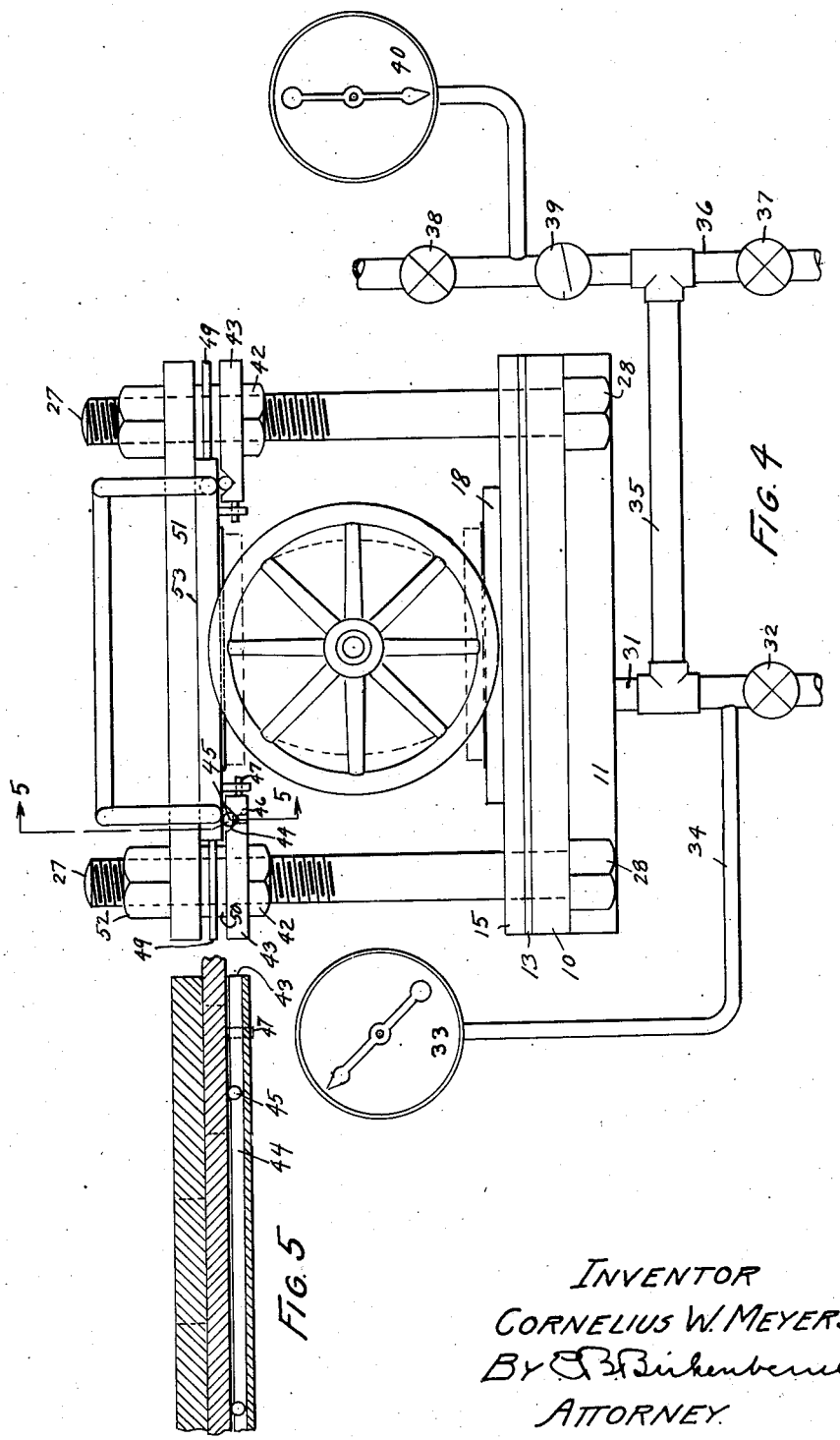
INVENTOR
CORNELIUS W. MEYERS.
By ⟨signature⟩
ATTORNEY.

Patented Aug. 26, 1947

2,426,406

UNITED STATES PATENT OFFICE 2,426,406

HYDRAULIC VALVE TESTER

Cornelius W. Meyers, Portland, Oreg.

Application October 10, 1944, Serial No. 558,038

2 Claims. (Cl. 73—37)

This invention relates generally to testing apparatus and particularly to a hydraulic valve tester.

The main object of this invention is to provide a valve tester of the class described whereby a valve may be readily tested as to its seat and flanges and inspected during the testing operation.

The second object is to construct a device of the class described which would be adaptable for testing valves of various dimensions and in which the various necessary testing operations may be easily, quickly and efficiently performed.

The third object is to construct a device of the class described which may be used interchangeably with gaseous or liquid testing mediums.

I accomplish these and other objects in a manner set forth in the following specification as illustrated in the accompanying drawing, in which Fig. 1 is a side elevation of the device with parts broken away in section showing the plane slide in a flange testing position.

Fig. 2 is a fragmentary section along the line 2—2 in Fig. 3 showing the plate slide in a valve seat testing position.

Fig. 3 is a plan of Fig. 1 with portions broken away to show the parts beneath.

Fig. 4 is a front elevation of the device with parts broken away in vertical section.

Fig. 5 is a section taken along the line 5—5 in Fig. 4.

Fig. 6 is a fragmentary section through the edge of the base casting, the ring casting and the interposed diaphragm.

Similar numerals refer to similar parts throughout the several views.

Referring in detail to the drawing, there is shown a base 10 having stiffening ribs 11 radiating from the center of the under side thereof, the base 10 having a cylindrical cavity 12 formed in the top thereof. A diaphragm 13 of rubber or other suitable resilient material is placed across the top of the base 10, whose upper surface 14 is preferably corrugated as shown in Fig. 6. The diaphragm 13 is held down by the ring 15 through which extend the bolts 16 into the base 10. The ring 15 has a central opening 17 which is somewhat smaller than the cavity 12. In the opening 17 is slidably disposed the piston 18, whose under sides rests upon the diaphragm 13. It is desirable to recess the top side 19 of the piston 18 to receive the gasket 20.

In the piston 18 is formed a threaded opening 21, in which is placed a bushing 22 having a central opening 23, which is of relatively small dimensions for reasons which will be explained later. The opening 22 communicates, by means of an opening 24 in the diaphragm 13, with the interior of the cavity 12. A metallic ring 25 is placed around the opening 24 and held against the diaphragm 13 by means of the screws 26.

At each corner of the rectangular base 10 is placed a pillar bolt 27, whose head 28 is on the under side of the base 10 and whose upper threaded end 29 is sufficiently long to permit the testing of the largest valve to be tested on the device.

In the base 10 is formed an opening 30 for an inlet and outlet pipe 31, provided with an outlet valve 32. A hydrostatic pressure gauge 33 is connected by a pipe 34 to the pipe 31. The pipe 31 is connected by a branch pipe 35 to the pressure supply pipe 36, which is connected to any convenient source of pressure (not shown) under the control of the shut off valves 37 and 38 and the interposed check valve 39. The air pressure gauge 40 is connected by means of the pipe 41 to the pressure supply pipe 36 between the valves 38 and 39. On the ends 29 of the bolts 27 are placed the nuts 42, upon which rests the guides 43, upon the upper inner face of each of which is formed a V-groove 44 adapted to receive the balls 45, whose travels are limited by the stop pins 46 placed within the groove 44. Horizontal stop pins 47 extend from the sides 48 of the guides 43. Mounted over each guide 43 is a side guide 49 spaced therefrom by washers 50, which are also placed on the top side of the side guide 49. On the pillar bolts 27 is mounted the top backing plate 51, which is held down upon the washers 50 by means of the nuts 52.

Interposed between the guides 49 and between the under side 53 of the backing plate 51 and the top of the rollers 45 is a plate slide 54, having an opening 55 disposed along the center line and nearer to the handle end 56 of the slide 54 than it is to the opposite end 57. A handle 58 is formed on the slide 54, which is reversely turned to permit the slide 54 to be moved to a position where the opening 55 will be in alignment with the opening 59 in the valve to be tested, and also in alignment with the central opening 60 formed in the top of the backing plate 51. A check valve 61 is mounted in the slide 54 for reasons which will be explained later.

A gasket 62 is secured on the under side of the plate 54, having an opening therein which coincides with the opening 55.

In the drawing is indicated in dotted lines a common form of gate valve 63, having the usual seats 64 and flanges 65. The gate 66 is operated by a hand wheel 67, as is well understood. The operation of the device is as follows:

Assuming that a valve 63 is to be tested under pressure, it is placed in the device with one of its flanges 65 resting upon the gasket 20. Assuming that the entire valve is being tested by pressure and for flange finish, the gate 66 is moved to an open position and with the valve 32 closed, the valve 37 is opened permitting liquid to flow from the pipe 36 through the pipe 31 through the small opening 23 into the interior 69 of the valve 63. Due to the fact that the area of the opening 23 is many times smaller than the area of the piston 18, the pressure within the cavity 12 forces the piston 18 upwardly carrying the valve 63 upwardly until its uppermost flange 65 engages the gasket 62. Now the air which is trapped in the upper portion of the valve 63 is permitted to escape through the check valve 61, which closes automatically when the air is driven from the device. Such valves are in common use and need not be explained here. Under this test it is necessary that the plate slide 54 be moved so that a blank portion thereof will be directly over the opening in the valve body, forming a closure therefor. Pressure is permitted to build up within the valve 63 until the indicator on the hydraulic pressure gauge 33 reaches a predetermined value, the operator watching for leaks in the valve body and around the flanges 65 and the gland packings.

Assuming that this test is satisfactory, the valve 37 is closed and the valve 32 is opened, permitting the piston 18 to descend under the weight of the valve 63.

Should it be desired to test the valve seats 64, it is necessary to close the gate 66 and move the slide 54 to a position in which the opening 60 will register with the opening in the valve body. In this case, it is necessary to permit any air trapped in the lower portion of the valve to escape through the valve before completely closing same, then by any convenient means, removing the water from the top side of the gate 66 before making the pressure test. Any leak will be observable since the seating portion of the valve is in full sight.

It will be noted in Fig. 4 that there is indicated an air pressure gauge 40. This is provided in cases where it is desired to apply only an air pressure test. In such cases, the valve 38 is operated instead of the valve 37, hydrostatic pressure being normally prevented from reaching the gauge 40 by the check valve 39, which closes under the hydrostatic pressure and seals under an air pressure.

Attention is drawn to my simultaneously filed application Serial Number 558,037 filed October 10, 1944, for a hydraulic truck scale, in which the details and objectives of the special form of hydraulic cylinder and piston are fully set forth.

While I have thus illustrated and described my invention, it is not my desire to be limited to the precise form shown herein, and I intend to cover such forms and modifications of the invention as fall fairly within the appended claims.

I claim:

1. A hydraulic press of the class described characterized by having a pressure actuated piston at one end thereof and a backing plate at the opposite end thereof, said backing plate having an enlarged opening therein in axial alignment with said piston, a slidable plate also having an opening therein, which opening may be selectively moved into or out of register with the opening in said backing plate, said sliding plate and said piston having gaskets on their adjacent faces between which a valve may be held, and said piston having an opening therethrough communicating with the interior of its cylinder whereby the piston actuating fluid may pass into a valve when mounted on said piston, and owing to the difference in diameters of the piston opening and the effective area of the piston.

2. A valve tester of the class described consisting of a hydraulic press including a ram constituting a table upon which a valve may be mounted, a head for said press having an opening therein communicating with the end of said valve opposite said ram, a slide disposed between said head and valve having an opening therein, adapted to be brought into register with the opening in said head or to form a closure therefor, said ram having an opening therein communicating with the pressure side thereof and said slide having a check valve therein adapted to close under pressure within said valve.

CORNELIUS W. MEYERS.

REFERENCES CITED

The following references are of record in the file of this patent:

UNITED STATES PATENTS

| Number | Name | Date |
| --- | --- | --- |
| 1,467,813 | Rahm | Sept. 11, 1923 |
| 1,571,958 | Mueller et al. | Feb. 9, 1926 |
| 909,950 | Schreidt | Jan. 19, 1909 |
| 1,973,674 | Rosenkranz | Sept. 11, 1934 |